Jan. 8, 1924.

E. B. GLENDENNING

VALVE

Filed Jan. 29, 1923

INVENTOR:
Everett B. Glendenning
BY Henry T. Williams
ATTORNEY

Jan. 8, 1924. 1,479,802
E. B. GLENDENNING
VALVE
Filed Jan. 29, 1923 3 Sheets-Sheet 3

INVENTOR
Everett B. Glendenning
BY Henry T. Williams
ATTORNEY

Patented Jan. 8, 1924.

1,479,802

UNITED STATES PATENT OFFICE.

EVERETT B. GLENDENNING, OF BOSTON, MASSACHUSETTS, ASSIGNOR TO McTARNAHAN FUEL OIL BURNING CORPORATION, OF BOSTON, MASSACHUSETTS, A CORPORATION OF MASSACHUSETTS.

VALVE.

Application filed January 29, 1923. Serial No. 615,572.

*To all whom it may concern:*

Be it known that I, EVERETT B. GLENDENNING, a citizen of the United States, residing at Boston, in the county of Suffolk and State of Massachusetts, have invented certain new and useful Improvements in Valves, of which the following is a specification.

The invention to be hereinafter described relates to valves, and more particularly to valves having provision for manual and automatic regulation.

One of the purposes of the invention is to provide a simple, efficient valve construction in which the pressure of the regulated fluid passing through the valve casing is balanced with respect to the valve, thereby enabling ready adjustment thereof with minimum friction and wear on the parts of the construction.

This valve is adapted for a number of different uses, such, for example, as in apparatus for regulating the flow of fuel oil and steam to burners.

In such regulating apparatus it is desirable that the flow of fuel oil and steam shall be automatically regulated in response to variations in the pressure of steam developed by the boiler. By the use of valves such as shown in the present application, the valves may be automatically adjusted to vary the flow of the fluid with a desirable nicety of control, and by independent adjustment, the valves may be manually regulated or set for different conditions, such, for example, as in installations where the valves are used to regulate the supply of fluid to different numbers of burners.

The character of the invention will be best understood by reference to the following description of one good form thereof shown in the accompanying drawings, wherein.

Figure 1:
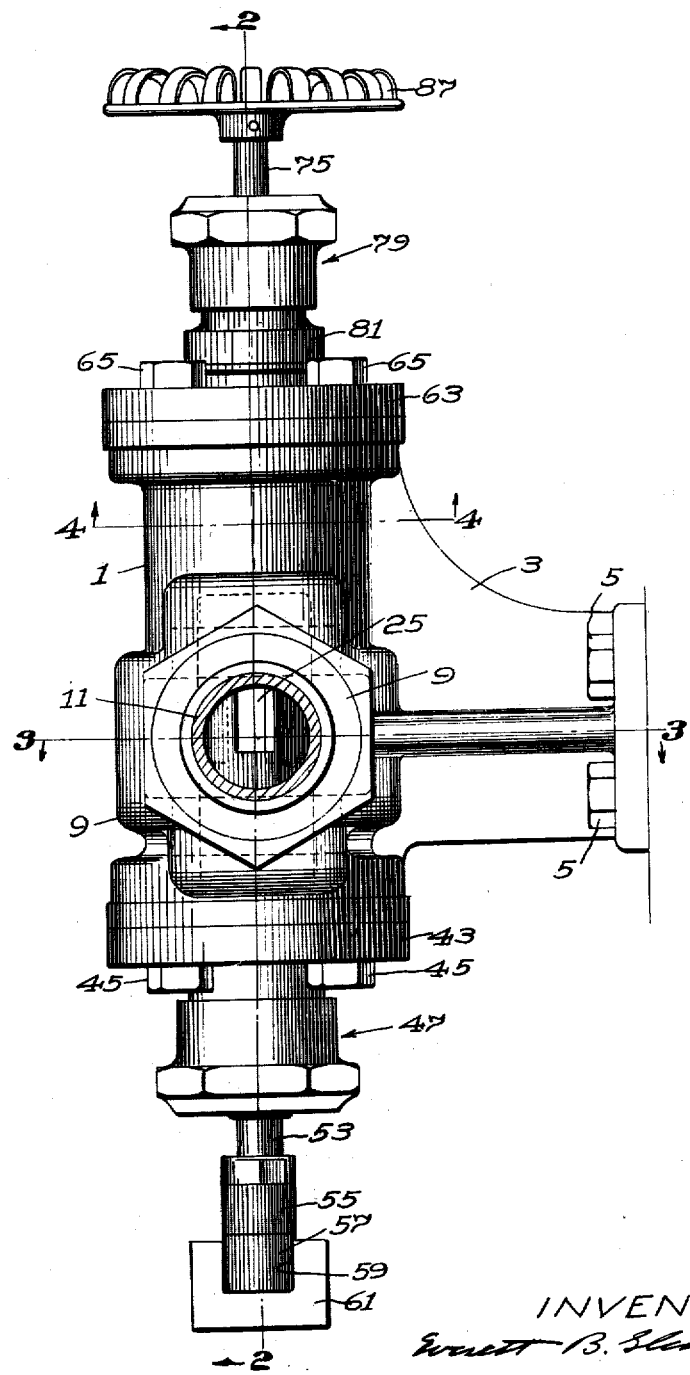
Fig. 1 is a plan of a valve embodying the invention.
Figure 2:
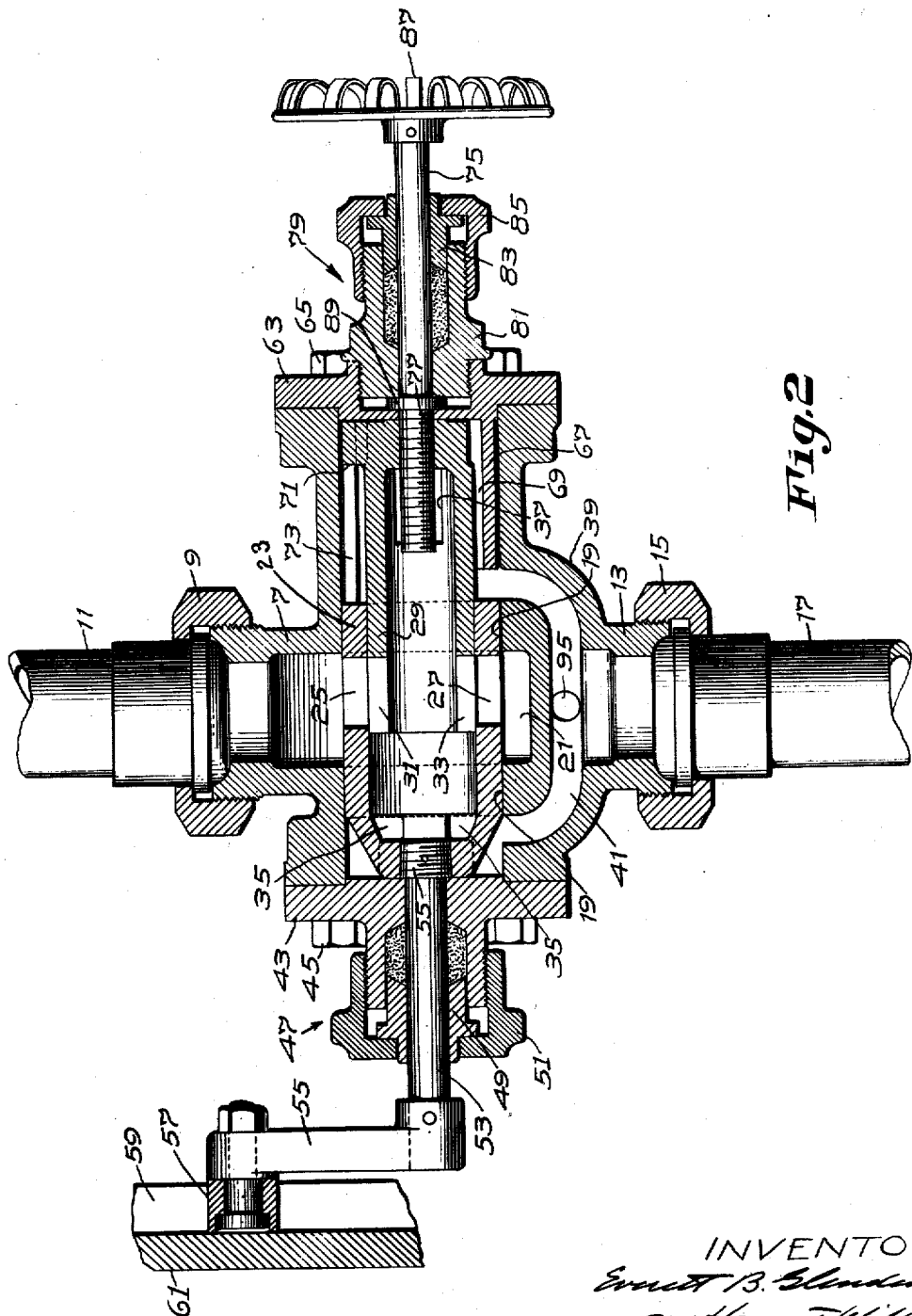
Fig. 2 is a vertical longitudinal section taken on line 2—2 of Fig. 1.
Figure 3:
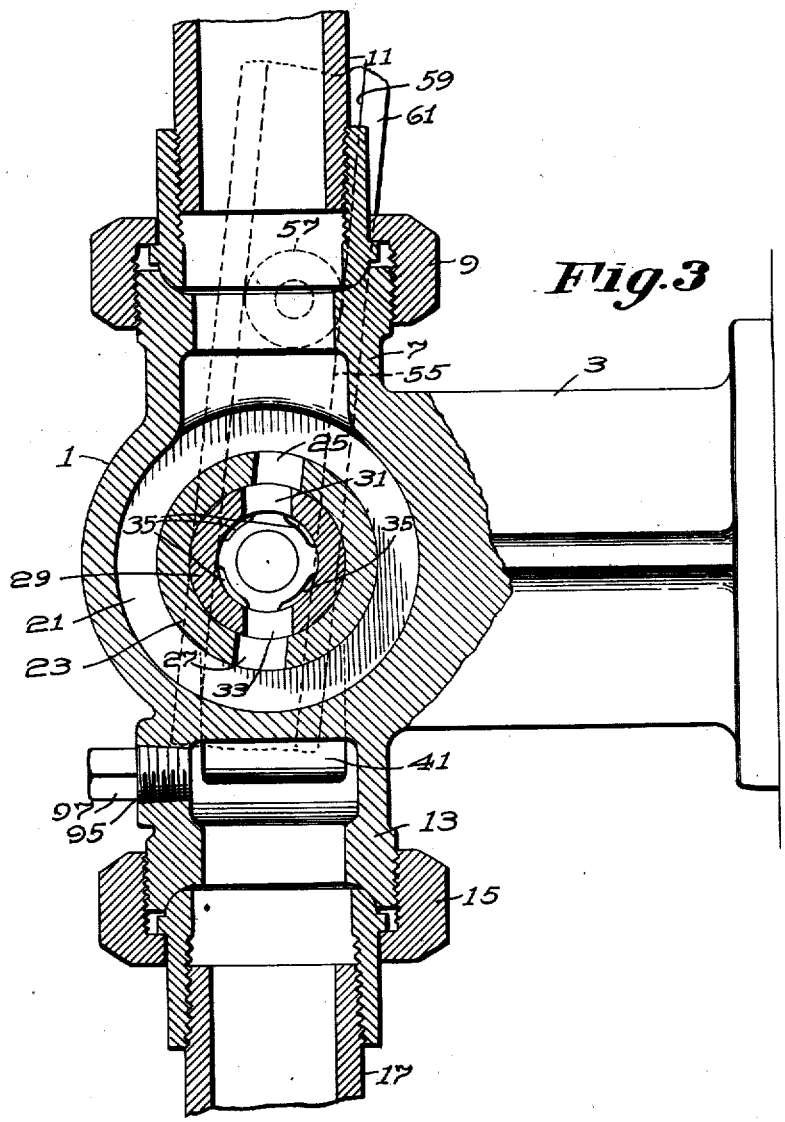
Fig. 3 is a vertical transverse section taken on line 3—3 of Fig. 1.
Figure 4:
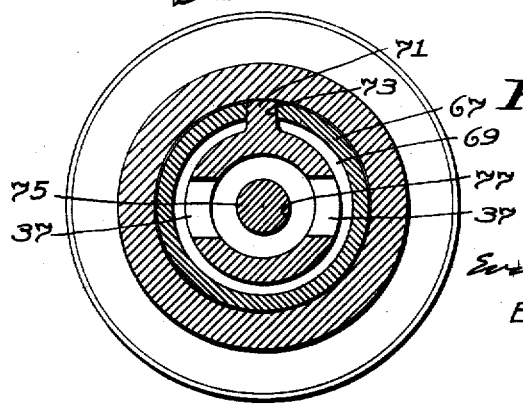
Fig. 4 is a transverse section taken on line 4—4 of Fig. 1.

Referring to the drawings, the valve shown therein as one good form of the invention, comprises a casing or body 1 of general cylindrical form carried by a bracket 3 adapted to be secured by bolts 5 to a suitable support.

Projecting from the body 1 is an inlet neck 7 externally threaded to receive a nut 9 for securing a pipe 11 to said neck. Also projecting from the body, and in the present instance in opposition to the inlet neck 7 is an outlet neck 13 externally threaded to receive a nut 15 for securing a pipe 17 to said outlet neck.

The body is formed to present cylindrical seats 19 between which is an annular passage 21 internally open and communicating with the inlet neck 7. Mounted in the seats 19 is an outer sleeve or valve 23 provided with diametrically opposed ports 25 and 27 communicating with the annular passage 21, said sleeve being circumferentially exposed to said passage.

Fitted in and telescoping with the outer sleeve is an inner sleeve 29 provided with diametrically opposed ports 31 and 33 adapted for communication with the outer sleeve ports. The outer sleeve is provided with outlet ports 35 adjacent one end thereof, and the inner sleeve is provided with diametrically opposed outlet ports 37 adjacent one end thereof.

To establish communication from the outlet ports 35 and 37 to the outlet neck 13, the valve body may be provided with an enlargement 39 containing a U-shaped passage 41 having one end communicating with the outlet ports 35, and the other end communicating with the outlet ports 37. This passage 41 bridges the annular passage 21 referred to, and opens into the outlet neck.

The valve body is provided at one end thereof with a head 43 secured to the body by suitable screw bolts 45, said head being formed to provide a stuffing box 47 having a gland 49 secured to the head by a cap 51.

Suitable means may be provided rotatively to adjust the outer sleeve or valve 23. In the present instance, this means comprises a stem 53 having an end portion 55 tapered and threaded into a tapered bore in one end of the sleeve 23. This stem projects through the stuffing box 47, and is provided with a crank 55 carrying a roller 57 adapted to work in a groove 59 in a member 61 which may be set in different positions of angular adjustment, and may be reciprocated by a cylinder and piston. Since the apparatus for reciprocating the member 61 forms no part of the present invention, it is believed unnecessary further to show and describe the same herein.

The construction is such that when the inclined member 61 is reciprocated, it will rock the crank 55, the stem 53 and sleeve 23, thereby rotatively to adjust said sleeve and vary the extent of the overlap of the ports 25 and 27 with respect to the inner sleeve ports 31 and 33. The outer sleeve may be adjusted completely to close the ports 31 and 33 or to vary the amount of opening of the ports as required.

The valve body may be provided with a head 63 on the end opposite to the head 43, and secured to the body by suitable screw bolts 65. Projecting from the head 63 into the body, is a collar 67 encircling a portion of the inner sleeve 29 and spaced therefrom to leave a passage 69 through which the fluid may pass from the outlet ports 37 to the U-shaped passage 41.

The inner sleeve is provided with a key 71 projecting into a slot 73 formed in the collar 67. The construction is such that the inner sleeve is confined against rotation, but is susceptible of longitudinal adjustment, thereby to vary the extent of overlap of the inner sleeve ports 31 and 33 with respect to the outer sleeve ports 25 and 27.

Suitable means may be provided manually to adjust the inner sleeve longitudinally. To accomplish this, in the present instance, a stem 75 is threaded in a bore 77 in an end of the inner sleeve. This stem may be provided with a stuffing box 79 conveniently comprising a plug 81 threaded into the head 63, and a gland 83 secured in the plug by a cap 85. At the outer end of the stem 75 is a hand wheel 87. Intermediate the ends of the stem is a flange 89 confined between the head and the inner end of the plug 81, thereby to prevent the stem from having axial movement.

The construction is such that when the hand wheel is rotated, the threaded portion of the stem 75 will adjust the inner sleeve longitudinally, thereby to vary the amount of overlap of the inner sleeve ports with respect to the outer sleeve ports.

The enlargement 39 of the body may have a tapped hole 95 closed by a plug 97 and communicating with the U-shaped passage 41. This plug may be removed and a gage may be connected to the tapped hole to indicate the pressure at the outlet side of the valve, and thereby show the pressure of the fluid delivered to the burner or burners.

The construction is such that the outer sleeve may have automatic adjustment, and the inner sleeve may have manual adjustment. The latter may be set in different positions according to varying conditions as required, and after the inner sleeve has been adjusted, the outer sleeve may be automatically adjusted to vary the effective openings as provided by adjustment of the inner sleeve.

The valve construction described provides a desirable balanced valve construction. The fluid entering the valve body from the inlet neck 7, enters the annular passage 21, and thus completely surrounds the outer sleeve 23 and exerts the same pressure throughout the circumference thereof. Also, the fluid entering the sleeves, flows out through the ports at the ends of the sleeves, and enters the spaces between the ends of the sleeves and the heads of the casing and surrounds the portion of the inner sleeve which projects beyond the outer sleeve. The consequence is that the fluid does not press the outer sleeve against its seat, does not press the inner sleeve against the outer sleeve, and does not press the ends of the sleeves against the heads, and therefore, in a sense the sleeves may be regarded as floating in their mounting within the casing, thereby enabling the same to be very easily adjusted with a minimum amount of friction and wear.

By my invention a simple, strong, efficient valve construction is provided, susceptible of two independent adjustments, one of which may be automatic, and the other may be manual.

The valve is adapted for a number of different purposes, including its use in automatic regulating apparatus such as mentioned above, and fuel oil burning equipment in which a forced draft of air is delivered to a mechanical burner or burners. In the latter installations the draft may be produced by a blower which is driven by a steam engine. A valve such as disclosed herein may be employed in the steam line between the steam engine and the boiler supplying steam thereto. An automatic regulator may be employed to effect the automatic adjustment of the valve, in order to vary the supply of steam delivered to the engine to drive the blower at different speeds to maintain the predetermined draft of air desired. The valve may be set by the manually adjustable means to vary the amount of steam delivered to the engine, according to the number of burners employed.

It will be understood that the invention is not limited to the specific embodiment shown, and that various deviations may be made therefrom without departing from the spirit and scope of the appended claims.

What is claimed is:

1. A valve comprising a casing having inlet and outlet necks and formed to present a cylindrical seat and a passage communicating with the inlet neck, an outer rotatively adjustable sleeve mounted in said seat and circumferentially exposed to said passage and having opposed ports opening into said passage to admit fluid from the inlet neck and passage into the sleeve, and an inner longitudinally adjustable sleeve telescoping with the outer sleeve and having ports for registration with the outer sleeve ports and adapted to vary the effective openings of the latter on longitudinal adjustment of the inner sleeve, and the sleeves also having ports through which the fluid may pass from within the sleeves to the outlet neck.

2. A valve comprising a casing having inlet and outlet necks and formed to present a cylindrical seat and an annular passage communicating with the inlet neck, and inner and outer sleeves mounted in said seat and having registering ports for establishing communication between said passage and sleeves, the outer sleeve being circumferentially exposed to said annular passage, said sleeves having ports for establishing communication between said sleeves and the outlet neck, and means relatively to adjust said sleeves, thereby to vary the effective openings of their registering ports.

3. A valve comprising a casing having inlet and outlet necks adapted for connection with pipes for conducting fluid to and from the casing, the latter being formed to present an annular passage, inner and outer sleeves mounted in the casing and provided with ports for permitting fluid to pass from said passage into said sleeves and thence from said sleeves to the outlet neck, the outer sleeve being circumferentially exposed to the pressure of the fluid in the annular passage, and means relatively to adjust said sleeves, thereby to regulate the flow of fluid therethrough.

4. A valve comprising a casing having an inlet and an outlet, telescoping sleeves mounted in said casing having registering ports communicating with the inlet, said sleeves having ends and openings to allow escape of fluid from said sleeves, that the fluid may pass from said sleeves between the ends thereof and the ends of the casing, means rotatively to adjust one of said sleeves to vary the effective openings of said ports, and means longitudinally to adjust the other sleeve further to vary the effective openings of said ports.

5. A valve comprising a casing having an inlet and an outlet, a pair of telescoping sleeves mounted in said casing having registering ports, means for imparting rotative adjustment to one of the sleeves to vary the effective openings of said ports, and means longitudinally to adjust the other sleeve, further to vary the effective openings of said ports, said casing and the sleeves being constructed and arranged to permit fluid to press equally throughout the circumference of said sleeves.

6. A fluid regulating valve comprising a casing having an inlet and an outlet, a pair of telescoping sleeves mounted in said casing having registering ports and each of said sleeves having an end, means rotatively to adjust one of said sleeves to vary the effective openings of said ports, and means longitudinally to adjust the other sleeve, further to vary the effective openings of said ports, said casing and said sleeves being constructed and arranged so that the pressure of the fluid regulated by said sleeves is equalized circumferentially of said sleeves, and is equalized on the inner and outer surfaces of the ends of the sleeves, thereby providing a balanced construction facilitating adjustment of said sleeves.

7. A fluid regulating valve comprising a casing having an inlet and an outlet, heads at opposite ends of said casing, a pair of telescoping sleeves mounted in said casing having registering ports for communication with said inlet, and fluid escape openings for communication with said outlet, and means relatively to adjust said sleeves to vary the effective openings of said ports to regulate the amount of fluid passing through the sleeves, said sleeves having provision admitting fluid between the ends of the sleeves and the heads of the casing, thereby to equalize the fluid pressure on the inner and outer surfaces of the ends of the sleeves.

8. A fluid regulating valve comprising a casing having an inlet and an outlet, a pair of telescoping sleeves mounted in said casing having registering ports, and means relatively to adjust said sleeves to vary the effective openings of said ports, said casing being formed to provide a passage surrounding one of said sleeves for admitting fluid to said ports, that the fluid may press equally throughout the circumference of said sleeve.

9. A fluid regulating valve comprising a casing having an inlet and an outlet, heads and stuffing boxes at opposite ends of said casing, a pair of telescoping sleeves mounted in said casing between said heads and having registering ports, stems connected to said sleeves, one projecting through one of said stuffing boxes, and the other stem projecting through the other stuffing box, means to confine one of said sleeves against rotative movement while permitting longitudinal adjustment thereof, and the other sleeve being adapted to receive rotative adjustment, said adjustments serving to vary the effective openings of said ports, and said casing being formed to provide a passage surrounding one of said sleeves for conducting fluid from the inlet to said ports and for equalizing the pressure of the fluid circumferentially of the sleeve.

10. A fluid regulating valve comprising a casing having an inlet and an outlet, heads and stuffing boxes at opposite ends of said casing, a pair of telescoping sleeves mounted in said casing between said heads and having registering ports, stems connected to said sleeves, one projecting through one of said stuffing boxes, and the other stem projecting through the other stuffing box, means to confine one of said sleeves against rotative movement while permitting longitudinal adjustment thereof, and the other sleeve being adapted to receive rotative adjustment, a crank on one of the stems and a handle on the other stem, said adjustments serving to vary the effective openings of said ports, and said casing being formed to provide a passage surrounding one of said sleeves for conducting fluid from the inlet to said ports and for equalizing the pressure of the fluid circumferentially of the sleeve.

11. A fluid regulating valve comprising a casing having an inlet and an outlet and heads at opposite ends of the casing, a pair of telescoping sleeves having registering ports, and said sleeves having ends opposed to said heads and having outlet ports, a stem connected to the end of one of said sleeves and projecting through one of said heads for imparting rotative adjustment to said sleeve, and a stem threaded in the end of the other sleeve and projecting through the other head for imparting longitudinal adjustment to said sleeve, said adjustments serving to vary the effective openings of said ports, and said casing being formed to provide a passage surrounding the rotatively adjustable sleeve, thereby to equalize the pressure of the fluid circumferentially thereof.

12. A fluid regulating valve comprising a casing having an inlet and an outlet, a pair of telescoping sleeves mounted in said casing having registering ports, said casing being formed to provide a passage surrounding one of said sleeves, communicating with said inlet and communicating with said ports, said sleeves being provided with outlet ports, and said casing being formed to provide a passage bridging the first-named passage and communicating with the outlet ports and the casing outlet, means rotatively to adjust one of said sleeves, and means longitudinally to adjust the other sleeve, thereby to vary the effective openings of said registering ports.

EVERETT B. GLENDENNING.